(12) United States Patent
Yamanaka et al.

(10) Patent No.: US 12,130,261 B2
(45) Date of Patent: Oct. 29, 2024

(54) ABNORMALITY DIAGNOSIS SYSTEM AND ABNORMALITY DIAGNOSIS METHOD

(71) Applicant: THK CO., LTD., Tokyo (JP)

(72) Inventors: Shuhei Yamanaka, Tokyo (JP); Katsuya Iida, Tokyo (JP); Takuya Sakamoto, Tokyo (JP); Yoshiyuki Honjo, Tokyo (JP); Hiroshi Inoko, Tokyo (JP); Masatomo Tokuno, Tokyo (JP); Satoru Nagai, Tokyo (JP)

(73) Assignee: THK CO., LTD., Tokyo (JP)

( * ) Notice: Subject to any disclaimer, the term of this patent is extended or adjusted under 35 U.S.C. 154(b) by 405 days.

(21) Appl. No.: 17/605,316

(22) PCT Filed: Apr. 24, 2020

(86) PCT No.: PCT/JP2020/017776
§ 371 (c)(1),
(2) Date: Oct. 21, 2021

(87) PCT Pub. No.: WO2020/218543
PCT Pub. Date: Oct. 29, 2020

(65) Prior Publication Data
US 2022/0214311 A1 Jul. 7, 2022

(30) Foreign Application Priority Data
Apr. 25, 2019 (JP) ................... 2019-084361

(51) Int. Cl.
*G01N 29/12* (2006.01)
*G01M 15/02* (2006.01)

(52) U.S. Cl.
CPC ............ *G01N 29/12* (2013.01); *G01M 15/02* (2013.01)

(58) Field of Classification Search
CPC ........... G01N 29/12; G01N 2291/0258; G01N 29/14; G01M 15/02; G01M 7/025;
(Continued)

(56) References Cited

U.S. PATENT DOCUMENTS 11,209,008 B2 * 12/2021 Nishimura .......... G01M 13/045
2007/0237435 A1 10/2007 Nagao et al.
(Continued)

FOREIGN PATENT DOCUMENTS

JP        2007-263286 A     10/2007
JP        2018-109538 A      7/2018
WO    WO-2004013589 A1 *  2/2004 ............ G01H 1/003

OTHER PUBLICATIONS

International Search Report dated Jul. 7, 2020, issued in counterpart International Application No. PCT/JP2020/017776 (2 pages).

*Primary Examiner* — Timothy P Graves
(74) *Attorney, Agent, or Firm* — WHDA, LLP

(57) ABSTRACT

An abnormality diagnosis system that diagnoses an abnormality related to each control shaft in equipment in which the plurality of control shafts, each including a motor and an output unit driven by the motor, are incorporated, includes: a plurality of vibration sensors that are provided for the plurality of control shafts, respectively, and that detect vibration occurring in connection with driving of the motor corresponding to each control shaft; a calculation unit that calculates, for each of the plurality of control shafts, vibration levels in a plurality of predetermined frequency ranges, based on vibration information detected by each of the plurality of vibration sensors; and a diagnosis unit that diagnoses an abnormality related to each control shaft, based on a distribution state, across the plurality of predetermined frequency ranges and across the plurality of control shafts, of the vibration levels calculated by the calculation unit.

6 Claims, 6 Drawing Sheets

(58) Field of Classification Search
CPC ..... G01M 99/007; G01H 17/00; G01H 1/003; G01H 1/14
See application file for complete search history.

(56) References Cited

U.S. PATENT DOCUMENTS

2017/0363072 A1* 12/2017 Son .................... G01M 7/00
2020/0103311 A1    4/2020 Unno et al.

* cited by examiner

[Fig. 1A]
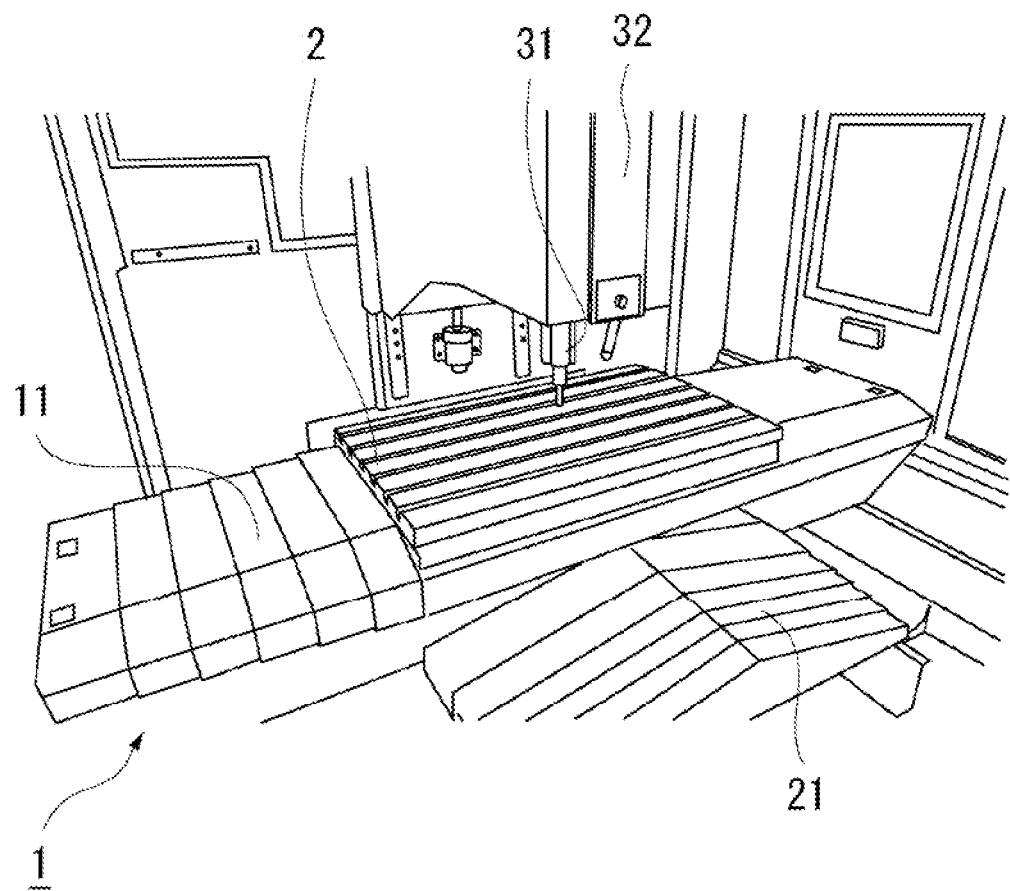

[Fig. 1B]
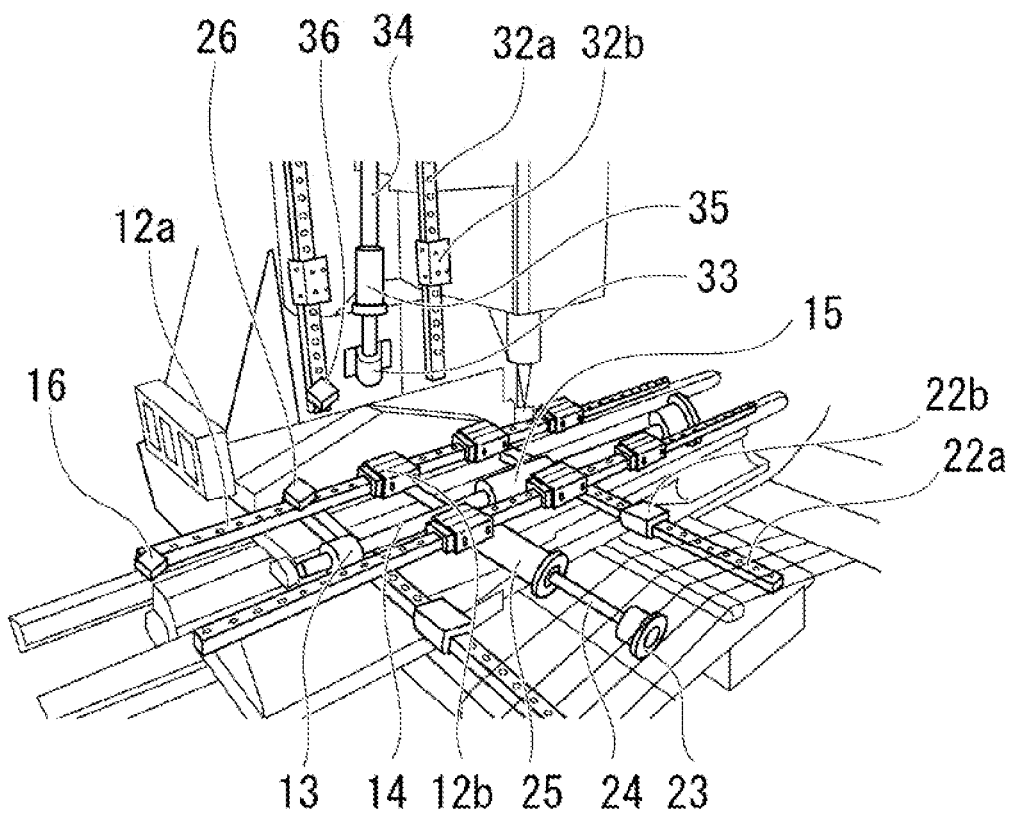

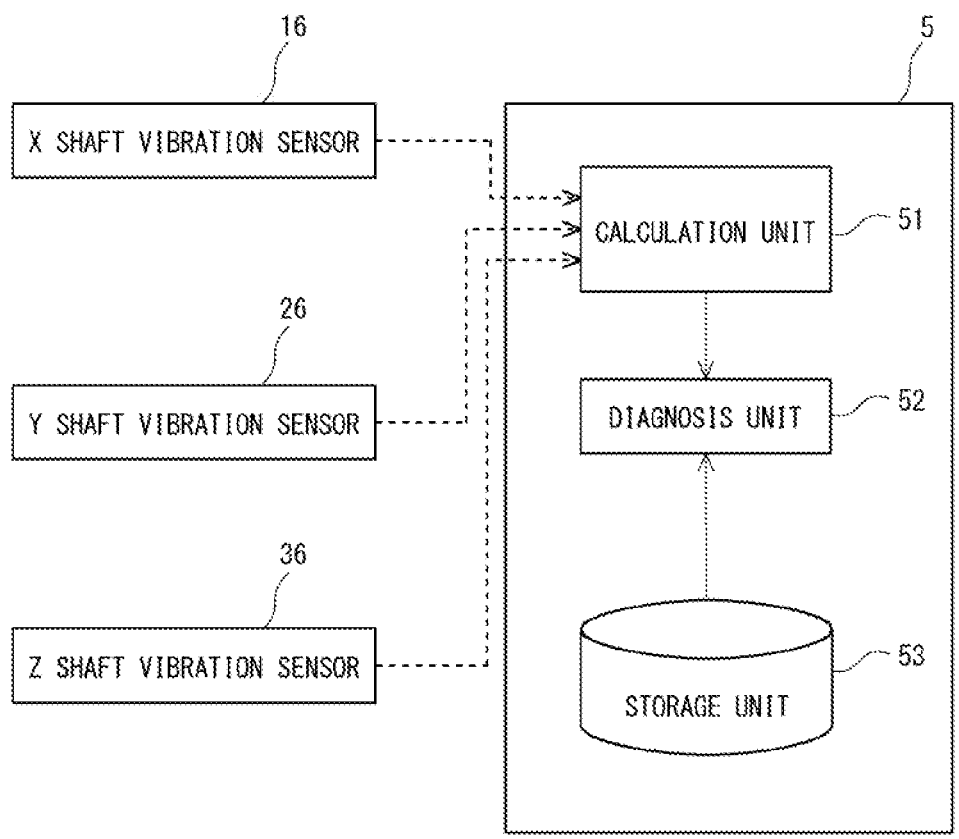
[Fig. 2]

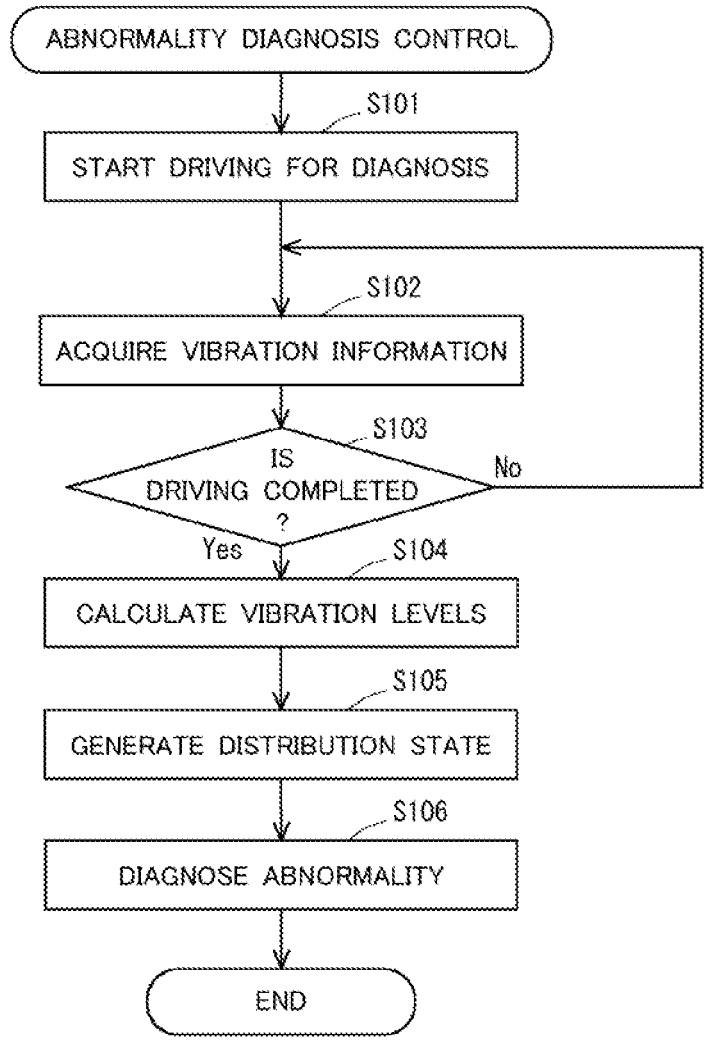

[Fig. 4A]

|  | X SHAFT VIBRATION SENSOR 16 | Y SHAFT VIBRATION SENSOR 26 | Z SHAFT VIBRATION SENSOR 36 |
|---|---|---|---|
| BAND 1 | 2 | 3 | 1 |
| BAND 2 | 3 | 4 | 1 |
| BAND 3 | 2 | 3 | 1 |
| BAND 4 | 1 | 1 | 1 |
| BAND 5 | 1 | 1 | 1 |

[Fig. 4B]

|  | X SHAFT VIBRATION SENSOR 16 | Y SHAFT VIBRATION SENSOR 26 | Z SHAFT VIBRATION SENSOR 36 |
|---|---|---|---|
| BAND 1 | 1 | 1 | 3 |
| BAND 2 | 1 | 1 | 2 |
| BAND 3 | 1 | 1 | 1 |
| BAND 4 | 1 | 1 | 1 |
| BAND 5 | 1 | 1 | 1 |

[Fig. 4C]

|  | X SHAFT VIBRATION SENSOR 16 | Y SHAFT VIBRATION SENSOR 26 | Z SHAFT VIBRATION SENSOR 36 |
|---|---|---|---|
| BAND 1 | 1 | 1 | 1 |
| BAND 2 | 1 | 1 | 1 |
| BAND 3 | 1 | 1 | 1 |
| BAND 4 | 1 | 1 | 2 |
| BAND 5 | 1 | 1 | 3 |

[Fig. 5A]

|  | X SHAFT VIBRATION SENSOR 16 | Y SHAFT VIBRATION SENSOR 26 | Z SHAFT VIBRATION SENSOR 36 |
|---|---|---|---|
| BAND 1 |  |  |  |
| BAND 2 |  |  |  |
| BAND 3 |  |  |  |
| BAND 4 |  |  |  |
| BAND 5 |  |  |  |

[Fig. 5B]

|  | X SHAFT VIBRATION SENSOR 16 | Y SHAFT VIBRATION SENSOR 26 | Z SHAFT VIBRATION SENSOR 36 |
|---|---|---|---|
| BAND 1 |  |  |  |
| BAND 2 |  |  |  |
| BAND 3 |  |  |  |
| BAND 4 |  |  |  |
| BAND 5 |  |  |  |

[Fig. 5C]

|  | X SHAFT VIBRATION SENSOR 16 | Y SHAFT VIBRATION SENSOR 26 | Z SHAFT VIBRATION SENSOR 36 |
|---|---|---|---|
| BAND 1 |  |  |  |
| BAND 2 |  |  |  |
| BAND 3 |  |  |  |
| BAND 4 |  |  |  |
| BAND 5 |  |  |  |

ABNORMALITY DIAGNOSIS SYSTEM AND ABNORMALITY DIAGNOSIS METHOD

TECHNICAL FIELD

The present invention relates to a system that diagnoses an abnormality in equipment including a plurality of control shafts, and to an abnormality diagnosis method for the system.

BACKGROUND ART

In various apparatuses and the like, such as robots, machine tools, and semiconductor and liquid crystal manufacturing apparatuses, a component for guiding a movable part along a course of the movable part is used. For example, a linear guide is used at a location where a movable part moves in a straight line. In selection of such a component, a component with a load rating in excess of a load multiplied by a safety factor is selected in general. However, in recent years, attempts have been made to manage components in such a manner that the components are made more qualified, for example, by attaching a strain gauge to a component and calculating an actual load applied to the component (for example, see patent document 1).

Moreover, patent document 2 discloses a technology of diagnosing, with high accuracy, a product lifespan of a linear guide. According to the technology, for each virtual segment defined by dividing a rolling surface of a moving member along a direction of a track formed by a track member of the linear guide, a moving-time stress, which is a stress occurring in each segment when the moving member is moving, is calculated based on an amount of displacement of the moving member with respect to the track, and the number of occurrences of the moving-time stress, which repetitively occurs with waving when the moving member moves along the track, is calculated for each segment based on the amount of displacement. Then, the lifespan of the linear guide is diagnosed based on a magnitude of each moving-time stress and the number of occurrences of the moving-time stress that are calculated.

CITATION LIST

Patent Literature

Patent Document 1: Japanese Patent Laid-Open No. 2007-263286
Patent document 2: Japanese Patent Laid-Open No. 2018-109538

SUMMARY OF INVENTION

TECHNICAL Problem

Equipment, such as a robot or a machine tool, includes various parts. In general, a plurality of motors are mounted to cause the equipment to perform a desired operation, and each motor is caused to drive in line with the desired operation. To make the equipment operate in a preferred manner, it is necessary to quickly detect a malfunction that occurs, and to perform maintenance of the equipment at an appropriate timing. Since there are many driven members in general equipment, abnormal states can occur at many places in the equipment as a whole, and many detection devices such as sensors are required in order to detect the abnormal states. Accordingly, it is not easy to detect abnormal states in equipment on which a plurality of motors are mounted, and it is difficult to enhance accuracy in detection of abnormal states.

Regarding equipment maintenance, there are cases in which after equipment actually breaks down, breakdown maintenance is performed to handle the breakdown, and cases in which maintenance is performed at a time when no breakdown occurs, based on past operation experiences, an operation history, or the like related to the equipment. However, in such ways of maintenance, it is hard to say that efficient operation of equipment can be achieved, because equipment is stopped for a relatively long time, or equipment is unnecessarily stopped although the equipment is still able to stably operate. On the other hand, to achieve efficient operation of equipment, it is preferable to quickly detect an abnormal state, which is a predictive sign of a breakdown, before the breakdown occurs, and to lead such detection to performing maintenance.

The present invention has been made in light of the above-described problem, and an object of the present invention is to provide a technology that enables both appropriate maintenance and efficient operation of equipment.

Solution to Problem

In the present invention, to solve the problem, an abnormality diagnosis system of the present invention adopts a configuration in which a vibration sensor is provided for each of a plurality of control shafts included in equipment, and with such a simple configuration, an abnormality of each control shaft is diagnosed based on a distribution state of vibration levels corresponding to the plurality of control shafts.

Specifically, the present invention is an abnormality diagnosis system that diagnoses an abnormality related to each control shaft in equipment in which a plurality of control shafts, each including a motor and an output unit driven by the motor, are incorporated, the equipment being configured such that at least one of the plurality of control shafts receives transmission of vibration due to driving of the motor for at least one of the other control shafts when the motor drives, the abnormality diagnosis system including: a plurality of vibration sensors that are provided for the plurality of control shafts, respectively, and that detect vibration occurring in connection with driving of the motor corresponding to each control shaft; a calculation unit that calculates, for each of the plurality of control shafts, vibration levels in a plurality of predetermined frequency ranges, based on vibration information detected by each of the plurality of vibration sensors; and a diagnosis unit that diagnoses an abnormality related to each control shaft, based on a distribution state, across the plurality of predetermined frequency ranges and across the plurality of control shafts, of the vibration levels calculated by the calculation unit.

Advantageous Effects of Invention

Both appropriate maintenance and efficient operation of equipment can be achieved.

BRIEF DESCRIPTION OF DRAWINGS

FIG. 1A illustrates an external appearance of a processing area of the equipment.
FIG. 1B illustrates a schematic configuration of three control shafts included in the equipment.

FIG. 2 illustrates a functional configuration of an abnormality diagnosis system according to the embodiment.

FIG. 3 is a flowchart of abnormality diagnosis control performed by the abnormality diagnosis system.

FIG. 4A is a first diagram illustrating a distribution state of vibration levels when an abnormal state occurs in the cover on the Y shaft.

FIG. 4B is a first diagram illustrating a distribution state of vibration levels when an abnormal state occurs in the spindle on the Z shaft.

FIG. 4C is a first diagram illustrating a distribution state of vibration levels when an abnormal state occurs in the spindle on the Z shaft.

FIG. 5A is a second diagram illustrating a distribution state of vibration levels when an abnormal state occurs in the cover on the Y shaft.

FIG. 5B is a second diagram illustrating a distribution state of vibration levels when an abnormal state occurs in the spindle on the Z shaft.

FIG. 5C is a second diagram illustrating a distribution state of vibration levels when an abnormal state occurs in the spindle on the Z shaft.

DESCRIPTION OF EMBODIMENTS

An abnormality diagnosis system of an embodiment diagnoses an abnormality of each control shaft in equipment in which a plurality of control shafts are incorporated, the equipment being configured such that at least one of the plurality of control shafts receives transmission of vibration occurring when a motor for at least one of the other control shafts drives the at least one of the other shafts. The transmission of vibration between the control shafts here means that the equipment is configured such that vibrations mutually interact between the control shafts. Each control shaft includes a corresponding motor and an output unit. A single control shaft may include a plurality of motors or a plurality of output units. The output units of the control shafts do not necessarily need to coincide with output units of the equipment, and a combination of output units of a plurality of control shafts may be formed as an output unit of the equipment.

In the equipment thus configured, when a motor corresponding to a certain control shaft of the plurality of control shafts drives, vibration occurring due to the driving can act on another control shaft. Accordingly, the then vibration is detected by a vibration sensor provided for each control shaft. In other words, the plurality of vibration sensors respectively provided for the plurality of control shafts can detect vibration that transmits to the entire equipment when any of the corresponding motors, each provided for each control shaft, drives. Moreover, all vibration levels (magnitudes of vibration) detected by the vibration sensors respectively provided for the control shafts in the equipment are not the same and reflect a mechanical configuration of the equipment.

Here, in the equipment, a difference arises in mechanical condition, in terms of transmission of vibration, between a case in which a mechanical component of the equipment is in a normal state and a case in which the mechanical component is in an abnormal state. Note that an "abnormal state" in the present embodiment refers to a state that is related to an operation status of the equipment in terms of equipment maintenance, that requires maintenance to make the equipment continue to operate, and that is different from a so-called broken-down state in which the equipment is completely unable to operate. In other words, an abnormal state in the equipment means a state in which the equipment is still able to operate but requires maintenance such as replacing a part sooner or later, and a state that is discriminated from a normal state. In comparison with the equipment in the normal state, a vibration level detected on each control shaft varies according to a degree of an abnormal state (hereinafter, assumed to include presence or absence of an abnormal state) in the equipment. Moreover, depending on types of abnormal state that can occur in the equipment, mechanical conditions related to transmission of vibration in the equipment can also vary by the type, and therefore a distribution state of vibration levels, obtained when the control shafts are viewed as a whole, can be associated with each type of abnormal state.

Accordingly, in the abnormality diagnosis system of the present embodiment, to be able to distinguish each type of abnormal state that can occur in the equipment, a calculation unit calculates a vibration level in each of a plurality of predetermined frequency ranges, based on vibration information detected by each vibration sensor, and then a diagnosis unit diagnoses an abnormality related to each control shaft in the equipment, based on a distribution state of the vibration levels across all of the control shafts, obtained across the plurality of control shafts. The plurality of predetermined frequency ranges can be appropriately configured by taking into consideration the mechanical configuration of the equipment and a vibration characteristic (vibration resonant frequency or the like) for making it easy to detect a possible abnormal state in the equipment. The plurality of frequency ranges do not necessarily need to be consecutive frequency ranges, and the frequency ranges do not necessarily need to have the same widths.

As described above, in the abnormality diagnosis system, with a relatively simple configuration in which the vibration sensor is provided for each control shaft, an abnormality in the equipment can be diagnosed in a preferred manner by taking into consideration a fact that vibrations mutually interact between the control shafts. In particular, information subjected to abnormality diagnosis is information obtained as a result of the equipment actually operating and therefore accurately reflects a decree of an abnormal state in the then equipment, and accordingly, the abnormality diagnosis can be implemented in a preferred manner while the operation of the equipment is maintained favorably. As a result, a timing of performing maintenance, such as replacing a part of the equipment, can also be set appropriately.

Hereinafter, a specific embodiment of the present invention will be described based on the drawings. Sizes, materials, shapes, relative dispositions, and the like of constituent parts described in the present embodiment are not intended to limit the technical scope of the invention thereto, unless otherwise stated.

EMBODIMENTS

FIGS. 1A and 1B illustrate a schematic configuration of a vertical machining center that is an example of equipment 1 to which the abnormality diagnosis system of the present embodiment is applied. In particular, FIG. 1A represents an external appearance of a processing area of the equipment 1, and FIG. 1B represents a schematic configuration of three control shafts included in the equipment 1. The equipment 1 is a vertical machining center including the three control shafts of X shaft, Y shaft, and Z shaft, and the X shaft and the Y shaft are disposed on a horizontal plane while the Z shaft is disposed in a vertical direction. As illustrated in FIG. 1A, a table 2 on which a workpiece is placed is arranged in the processing area of the equipment 1. The table 2 is controlled according to the X shaft and the Y shaft. A cover 11 is arranged over the X shaft, and a cover 21 is arranged over the Y shaft. Moreover, a spindle 31 is arranged such as to be able to apply cutting and processing to a workpiece placed on the table 2, and a position of the spindle 31 is controlled according to the Z shaft. Note that a main body of a motor for the spindle 31 is arranged inside a cover 32.

Here, details of each control shaft will be described based on FIG. 1B. On the X shaft, a motor 13 that is an actuator of the X shaft is arranged, an output shaft of the motor 13 is joined to a ball screw 14, and a nut 15 corresponding to the ball screw 14 corresponds to an output unit of the X shaft. The X shaft is a control shaft that directly drives the table 2, and movement of the table 2 along the X shaft is achieved by a rail 12a and a moving member 12b that supports the table 2 while sliding on the rail 12a. Similarly on the Y shaft, a motor 23 that is an actuator of the Y shaft is arranged, an output shaft of the motor 23 is joined to a ball screw 24, and a nut 25 corresponding to the ball screw 24 corresponds to an output unit of the Y shaft. The Y shaft is a control shaft that drives a composition of the table 2 and the X shaft, and movement of the composition along the Y shaft is achieved by a rail 22a and a moving member 22b that supports the composition of the table 2 and the X shaft while sliding on the rail 22a. On the Z shaft, a motor 33 that is an actuator of the Z shaft is arranged, an output shaft of the motor 33 is joined to a ball screw 34, and a nut 35 corresponding to the ball screw 34 corresponds to an output unit of the Z shaft. The Z shaft is a control shaft that drives the spindle 31 in the vertical direction, and movement of the spindle 31 along the Z shaft is achieved by a rail 32a and a moving member 32b that supports the spindle 31 while sliding on the rail 32a.

In the equipment 1 thus configured, both the X shaft and the Y shaft are control shafts that implements movement of the table 2 on the horizontal plane, and the mechanical components related to the X shaft are arranged on the Y shaft. Accordingly, it can be understood that the X shaft and the Y shaft are configured such that vibrations occurring due to driving of the respective motors 13, 23 can be mutually transmitted. The Z shaft, unlike the X shaft and the Y shaft, is a control shaft that allows the spindle 31 to move in the vertical direction, and it can be understood that the Z shaft is configured such that vibration can also be transmitted between the Z shaft and each of the X shaft and the Y shaft via a housing of the equipment 1, which is a machining center. Note that not all vibrations of the X to Z shafts are transmitted to each other, and there can be a vibration that is not transmitted between the control shafts substantially, depending on a characteristic (amplitude, frequency, or the like) of the vibration.

Moreover, each of vibration sensors 16, 26, 36 is arranged on each control shaft of the X to Z shafts, respectively, to detect vibration on the respective control shaft. Note that a direction of vibration detected by the vibration sensor 16 for the X shaft is an X-axis direction, a direction of vibration detected by the vibration sensor 26 for the Y shaft is a Y-axis direction, and a direction of vibration detected by the vibration sensor 36 for the Z shaft is a Z-axis direction. The vibration sensors 16, 26, 36 are arranged at end portions of the rails 12a, 22a, 32a included in the individual control shafts, respectively, so that movement of the output unit of each control shaft is not hindered. For the vibration sensors 16, 26, 36, publicly known vibration sensors or acceleration sensors can be used, and a detailed description thereof is omitted.

Here, a configuration of the abnormality diagnosis system of the present embodiment will be described based on FIG. 2. The abnormality diagnosis system includes a processing apparatus 5, and the vibration sensors 16, 26, 36 for the X to Z shafts electrically connected to the processing apparatus 5. The processing apparatus 5 is substantially a computer including an operation processing device and a memory, and functional units illustrated in FIG. 2 are formed by a predetermined control program being executed by the computer. Vibration information detected by each of the vibration sensors 16, 26, 36 is transferred to the processing apparatus 5.

The processing apparatus 5 includes a calculation unit 51, a diagnosis unit 52, and a storage unit 53. The calculation unit 51 receives vibration information on each control shaft from each respective one of the vibration sensors 16, 26, 36, and calculates, for each control shaft, vibration levels in a plurality of predetermined frequency ranges, based on the vibration information. A plurality of possible abnormal states that may occur in the equipment 1 can be associated with various vibrations that occur at each control shaft. For example, there is a case in which vibration more easily occurs on the X shaft than the other control shafts in a first abnormal state, and vibration more easily occurs on the Z shaft than the other control shafts in a second abnormal state. Moreover, there is a case in which in a third abnormal state and a fourth abnormal state, vibration tends to occur on the Y shaft, compared to the other control shafts, but a frequency characteristic of the vibration (for example, resonant frequency of the vibration) occurring on the Y shaft varies. When various abnormal states occurring in the equipment 1 can be associated with characteristics of vibrations on the control shafts as described above, an abnormal state in the equipment 1 can be diagnosed by utilizing such vibration-related characteristics. The plurality of predetermined frequency ranges are set, with such a respect taken into consideration. In other words, each of the predetermined frequency ranges can be set as appropriate, based a vibration characteristic for making it easy to detect a possible abnormal state that may occur in the equipment 1.

For example, in FIGS. 4A to 4C, which will be described later, five ranges (band 1 to band 5) are set as predetermined frequency ranges. Frequencies do not overlap between the frequency ranges, and for correlations between the frequencies belonging to the individual ranges, the relation of band 1<band 2<band 3<band 4<band 5 holds. The frequency ranges do not necessarily need to be consecutive frequency ranges, and widths of the frequency ranges (widths of the bands) do not necessarily need to be the same. Note that the set plurality of predetermined frequency ranges are used in common for each control shaft.

The calculation unit 51 performs fast Fourier transform (FFT) processing on the vibration information received from each of the vibration sensors 16, 26, 36 and, based on a frequency-related predetermined characteristic amount in a preset frequency range, calculates a vibration level in the frequency range. For the predetermined characteristic amount, for example, a peak value, a mean value, or the like of values obtained by the FFT processing in the frequency range may be adopted. The calculation unit 51 calculates a vibration level corresponding to each of the plurality of predetermined frequency ranges, for each control shaft, at the same timing. In the present embodiment, a vibration level is an index that is relatively calculated, on a basis of the above-described predetermined characteristic amount for each control shaft in the normal state in which no abnormal state occurs in the equipment 1, for example, as in a following expression:

Vibration level=(actual predetermined characteristic amount)/(predetermined characteristic amount in the normal state).

Accordingly, for example, in an example illustrated in FIGS. 4A to 4C, the vibration level is determined to be "1" when the actual predetermined characteristic amount has the same value as the predetermined characteristic amount in the normal state, and values of the vibration level vary due to a fact that a degree of an abnormal state in the equipment 1 is reflected on the actual predetermined characteristic amount. In other words, a larger value of the vibration level that exceeds "1" means a higher degree of an abnormal state in the equipment 1.

Next, the diagnosis unit 52 diagnoses an abnormality related to each control shaft, based on a distribution state, in each of the plurality of predetermined frequency ranges and across all of the control shafts, of the vibration levels calculated by the calculation unit 51. Since a control shaft that is more susceptible to an effect and a frequency range in which the effect more easily appears change depending on a type of abnormal state in the equipment 1, the distribution state can be said to be information reflecting a type of abnormal state in the equipment 1. Accordingly, as described above, the diagnosis unit 52 can conduct abnormality diagnosis, based on the distribution state of the vibration levels. To conduct the abnormality diagnosis, vibration distribution information to be compared with the distribution state is stored in the storage unit 53. The vibration distribution information is information associated with a possible abnormal state that may occur in the equipment 1, and is information on a distribution of vibration levels formed based on vibration information detected for each control shaft on an assumption that the abnormal state occurs in the equipment 1. In other words, the vibration distribution information is information related to a vibration distribution that discriminably represents an abnormal state occurring in the equipment 1 from other abnormal states. Accordingly, when a distribution state of vibration levels coincides with, or approximates to, certain vibration distribution information, the diagnosis unit 52 can make a diagnosis of occurrence of an abnormal state represented by the certain vibration distribution information in the equipment 1.

Here, an example of processing related to abnormality diagnosis control by the processing apparatus 5 will be described based on a flowchart illustrated in FIG. 3. The abnormality diagnosis control can be performed at a predetermined timing, such as before workpiece processing is started or after workpiece processing is completed in the equipment 1. First, in S101, driving of the motors 13, 23, 33 for the control shafts and the spindle 31 that are preset for diagnosis to detect an abnormal state in the equipment 1 is started. For example, one motor of the motors for the three control shafts or the spindle 31 may be caused to drive or driven, or the motors for the plurality of control shafts and the spindle 31 may be caused to drive and driven at the same time. By causing the motors and the like preset for abnormality diagnosis to drive in such a manner, abnormal states related to driving of the motors and the like can be narrowed down to some extent, and accuracy in detection of an abnormal state can be enhanced. When the processing in S101 is finished, the processing advances to S102.

In S102, while the motors and the like started to drive in S101 are driving, vibration on each control shaft is detected by the vibration sensors 16, 26, 36 provided for the control shafts, respectively, and the calculation unit 51 acquires vibration information related to the vibration. When the processing in S102 is finished, the processing advances to S103. In S103, it is determined whether or not the driving of the motors and the like that are started to drive in S101 is completed. When affirmative determination is made in S103, the processing advances to S104, and when negative determination is made, the processing in S102 continues to be performed.

In S104, the calculation unit 51 calculates, for each control shaft, vibration levels in the plurality of predetermined frequency ranges, based on the vibration information on each control shaft acquired in S102. Subsequently, in S105, the diagnosis unit 52 generates a distribution state of the vibration levels, and further in S106, diagnoses a degree of an abnormal state in the equipment 1, based on the generated distribution state.

Here, the diagnosis related to a degree of an abnormal state, conducted by the diagnosis unit 52 will be described based on FIGS. 4A to 4C. FIGS. 4A to 4C illustrate, distribution states of vibration levels generated in S105 when three illustrative abnormal states occur in the equipment 1. More specifically, FIG. 4A represents a distribution state of vibration levels when an abnormal state occurs in the cover 21 on the Y shaft. The distribution state is detected and generated, due to the motor 23 for the Y shaft being caused to drive. In the abnormal state of interest, vibration levels based on vibration information from the vibration sensor 26 for the Y shaft, as affected by the cover 21, are relatively high in the frequency ranges of the bands 1 to 3. Moreover, as described above, since the X shaft is arranged over the Y shaft in the equipment 1, the vibration attributable to the abnormal state of the cover 21 is easily transmitted to the X shaft. On the other hand, if the abnormal state is of the cover 21, the vibration attributable to the abnormal state is largely not transmitted to the Z shaft. As a result, in the frequency ranges of the bands 1 to 3, vibration levels of the X shaft are relatively high, similarly to the Y shaft, but are lower levels than the levels of the Y shaft. Moreover, vibration levels of the Z shaft are not affected by the X shaft or the Y shaft. As described above, the distribution state of the vibration levels illustrated in FIG. 4A can be said to be associated with the abnormal state of the cover 21 on the Y shaft.

FIG. 4B represents a distribution state of vibration levels when an abnormal state occurs in the spindle 31 on the Z shaft. The distribution state is detected and generated, due to the spindle 31 being driven. In the abnormal state of interest, it is assumed that cyclic mechanical vibration occurs in the spindle 31. At the time, vibration levels based on vibration information from the vibration sensor 36 for the Z shaft are relatively high in the frequency ranges of the bands 1 to 2, but, on the other hand, the vibration is largely not transmitted to the X shaft or the Y shaft. As described above, the distribution state of the vibration levels illustrated in FIG. 4B can be said to be associated with a certain abnormal state of the spindle 31 (that is, an abnormal state that causes the cyclic mechanical vibration). Moreover, FIG. 4C also represents a distribution state of vibration levels when an abnormal state occurs in the spindle 31 on the Z shaft, but in the abnormal state of interest, it is assumed that friction between metals occurs in the spindle 31. The distribution state is also detected and generated, due to the spindle 31 being driven. At the time, vibration levels based on vibration information from the vibration sensor 36 for the Z shaft are relatively high in the frequency ranges of the bands 4 to 5, which are relatively high frequency ranges, but, on the other hand, the vibration is largely not transmitted to the X shaft or the Y shaft. As described above, the distribution state of the vibration levels illustrated in FIG. 4C can be said to be associated with a certain abnormal state of the spindle 31 (that is, an abnormal state that causes friction between metals).

As described above, abnormal states that can occur in the equipment 1 are associated with distribution states of vibration levels, as illustrated in FIGS. 4A to 4C. Accordingly, the diagnosis unit 52 compares such a distribution state with the vibration distribution information stored in the storage unit 53, whereby based on a result of the comparison, when the distribution state coincides with any of the stored vibration distribution information, the diagnosis unit 52 can make a diagnosis of occurrence of an abnormal state represented by the coinciding vibration distribution information in the equipment 1. When a generated distribution state differs from the stored vibration distribution information, but an amount of the difference is within a predetermined limit (for example, when a condition is met, such as that the number of frequency ranges that differ from certain vibration distribution information is equal to or smaller than a predetermined number), the distribution state may be regarded as approximating to the certain vibration distribution information, and a diagnosis of occurrence of an abnormal state represented by the certain vibration distribution information in the equipment 1 can be made.

As described above, according to the present abnormality diagnosis control, with a relatively simple configuration in which the vibration sensors 16, 26, 36 are provided for the control shafts, respectively, diagnosis of an abnormality in the equipment 1 can be conducted in a preferred manner, by taking into consideration the fact that vibrations mutually interact between the control shafts. In particular, information subjected to the abnormality diagnosis is information obtained as a result of the equipment 1 actually operating and therefore accurately reflects a degree of an abnormal state in the then equipment 1, and accordingly, the abnormality diagnosis can be implemented while the operation of the equipment 1 can be maintained favorably. As a result, a timing of performing maintenance, such as replacing a part of the equipment 1, can also be set appropriately.

Note that in the abnormality diagnosis control, although the driving of the motors and the like for abnormality diagnosis is performed in S101, such driving is not necessarily required processing. In other words, the acquisition of vibration information in S102 may be performed when driving of motors and the like is performed for workpiece processing or the like in the equipment 1.

Moreover, in FIGS. 4A to 4C, the distribution states of the vibration levels are represented by distributions of numerical values. However, instead of such a form, each vibration level may be represented by corresponding pictorial (image) information as illustrated in FIGS. 5A to 5C. In FIGS. 5A to 5C, vibration levels and images are associated such that as a vibration level is higher, an image has a darker shade of color. FIG. 5A corresponds to FIG. 4A, FIG. 5B corresponds to FIG. 4B, and FIG. 5C corresponds to FIG. 4C. By representing the vibration levels in the form of images as described above, it is made easy to use publicly known deep learning techniques involving image processing. As a result, it is made easy to determine coincidence or a degree of approximation between a distribution state of vibration levels and the vibration distribution information stored in the storage unit 53 by comparison, and accordingly, a degree of an abnormal state in the equipment 1 can be diagnosed in a preferred manner.

Modification

In the hitherto described embodiment, a degree of an abnormal state in the equipment 1 is diagnosed by comparing a distribution state of vibration levels with the vibration distribution information. Here, regarding an abnormal state that can occur in the equipment 1, the abnormal state occurs suddenly in some cases, and the abnormal state gradually comes to appear, taking a certain amount of time, in some cases. In the latter case, it can be thought that a distribution state of vibration levels changes as an abnormal state in the equipment 1 changes, and when a distribution state of the vibration levels eventually coincides with or approximates to the vibration distribution state, a state is brought about in which the predetermined abnormal state occurs.

Accordingly, the diagnosis unit 52 can predict about when an abnormal state occurs, by using such changes in distribution state of vibration levels. Specifically, an abnormal state can be predicted, based on a history of driving of the respective motors 13, 23, 33 for the control shafts and the spindle 31 in the equipment 1, and on changes in distribution state of vibration levels. For example, assuming that in a distribution state of vibration levels at a current point of time, numerical values related to the X shaft and the Y shaft in the bands 1 to 3 are half the numerical values indicted in FIG. 4A, and that a history of driving of the motor 23 for the Y shaft up to the current point of time indicates 1000 hours, it can be predicted that the abnormal state indicated by FIG. 4A, that is, the abnormal state of the cover 21 on the Y shaft can occur when the motor 23 is made to drive for another 1000 hours.

When an abnormal state is predicted by the diagnosis unit 52 as described above, a result of the prediction is notified from the processing apparatus 5 to a user, whereby the user can be advised to prepare for maintenance work. Moreover, the abnormality diagnosis control illustrated in FIG. 3 is also performed, even if such prediction of an abnormal state is performed, whereby when the abnormal state actually occurs, the occurrence can be detected quickly.

REFERENCE SIGNS LIST 1 equipment
5 processing apparatus
13, 23, 33 motor
16, 26, 36 vibration sensor
31 spindle

The invention claimed is:

1. An abnormality diagnosis system that diagnoses an abnormality related to each control shaft in equipment in which a plurality of control shafts, each control shaft of the plurality of control shafts including a distinct motor and a distinct output unit driven by each distinct motor, are incorporated, the equipment being configured such that a first control shaft of the plurality of control shafts, the first control shaft, arranged to be driven by a first motor, at least receives transmission of vibration due to a second motor driving a second control shaft of the plurality of control shafts when the second motor drives, comprising:
 a plurality of vibration sensors that are provided for the plurality of control shafts, respectively, and that detect vibration occurring in connection with driving of each distinct motor corresponding to each control shaft, wherein each control shaft of the plurality of control shafts is connected to a distinct vibration sensor;
 a calculation unit that calculates, for each control shaft of the plurality of control shafts, vibration levels in a plurality of predetermined frequency ranges, based on vibration information detected by each vibration sensor of the plurality of vibration sensors; and a diagnosis unit that diagnoses an abnormality of each control shaft of the plurality of control shafts, based on a distribution state, across the plurality of predetermined frequency ranges and across the plurality of control shafts, of the vibration levels calculated by the calculation unit.

2. The abnormality diagnosis system according to claim 1, wherein the plurality of predetermined frequency ranges are set in common for the plurality of control shafts.

3. The abnormality diagnosis system according to claim 1, wherein the distribution state of the vibration levels is represented as image information in which each level of the vibration levels is discriminable, and the diagnosis unit diagnoses an abnormality related to each control shaft by performing predetermined image processing on the image information representing the distribution state of the vibration levels.

4. The abnormality diagnosis system according to claim 1, further comprising a storage unit that stores vibration distribution information indicating the distribution state of the vibration levels, the vibration distribution information being associated with one or more possible abnormal states in the equipment, wherein the diagnosis unit compares the distribution state of the vibration levels calculated by the calculation unit with the vibration distribution information stored in the storage unit, and diagnoses an abnormality related to each control shaft, based on a result of the comparison.

5. The abnormality diagnosis system according to claim 1, wherein the diagnosis unit predicts occurrence of an abnormal state related to each control shaft, based on a history of driving of the motors for the plurality of control shafts in the equipment, and on changes in the distribution state of the vibration levels calculated by the calculation unit.

6. An abnormality diagnosis method for diagnosing an abnormality related to each control shaft in equipment in which a plurality of control shafts, each control shaft of the plurality of control shafts including a distinct motor and a distinct output unit driven by each distinct motor, are incorporated, the equipment being configured such that a first control shaft of the plurality of control shafts, the first control shaft, arranged to be driven by a first motor, at least receives transmission of vibration due to a second motor driving a second control shaft of the plurality of control shafts when the second motor drives, comprising:

calculating, for each control shaft of the plurality of control shafts, vibration levels in a plurality of predetermined frequency ranges, based on vibration information related to vibration occurring in connection with driving of each distinct motor corresponding to each control shaft, the vibration being detected by each vibration sensor of a plurality of vibration sensors that are provided for the plurality of control shafts, respectively, wherein each control shaft of the plurality of control shafts is connected to a distinct vibration sensor; and diagnosing an abnormality related to each control shaft of the plurality of control shafts, based on a distribution state of the vibration levels across the plurality of predetermined frequency ranges and across the plurality of control shafts.

* * * * *